(12) United States Patent
Contreras et al.

(10) Patent No.: US 9,837,106 B1
(45) Date of Patent: Dec. 5, 2017

(54) TWO-DIMENSIONAL MAGNETIC RECORDING (TDMR) DISK DRIVE WITH MULTIPLE SENSORS AND CIRCUITRY FOR SELECTION OF AN ACTIVE PAIR OF ASSOCIATED AMPLIFIERS

(71) Applicant: Western Digital Technologies, Inc., San Jose, CA (US)

(72) Inventors: John Thomas Contreras, Palo Alto, CA (US); Howard Gordon Zolla, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/614,454

(22) Filed: Jun. 5, 2017

(51) Int. Cl.
| | |
|---|---|
| *G11B 5/60* | (2006.01) |
| *G11B 5/48* | (2006.01) |
| *G11B 5/39* | (2006.01) |
| *G11B 5/012* | (2006.01) |
| *G11B 5/02* | (2006.01) |
| *G11B 5/55* | (2006.01) |
| *G11B 20/10* | (2006.01) |

(52) U.S. Cl.
CPC ............ *G11B 5/3909* (2013.01); *G11B 5/012* (2013.01); *G11B 5/02* (2013.01); *G11B 5/3912* (2013.01); *G11B 5/3948* (2013.01); *G11B 5/4886* (2013.01); *G11B 5/5539* (2013.01); *G11B 5/5578* (2013.01); *G11B 20/10027* (2013.01)

(58) Field of Classification Search
CPC ... G11B 5/02; G11B 5/012; G11B 2005/0016; G11B 5/6005; G11B 5/4886; G11B 5/40; G11B 5/4836; G11B 5/4833; G11B 5/486; G11B 5/5539; G11B 5/5578
USPC .......... 360/75, 67, 245.8, 234.7, 316, 235.4, 360/245.1, 244.1
See application file for complete search history.

(56) References Cited

U.S. PATENT DOCUMENTS

| | | | |
|---|---|---|---|
| 8,824,106 B1 | 9/2014 | Garfunkel et al. | |
| 8,988,829 B1 * | 3/2015 | Contreras ............... | G11B 5/486 360/234.5 |
| 9,099,125 B1 | 8/2015 | Hattori et al. | |
| 9,196,266 B1 | 11/2015 | Contreras et al. | |
| 9,218,822 B1 | 12/2015 | Contreras et al. | |
| 9,218,823 B2 | 12/2015 | Kief et al. | |
| 9,230,578 B2 | 1/2016 | Batra et al. | |
| 9,305,593 B2 | 4/2016 | Hwang et al. | |
| 9,361,910 B2 | 6/2016 | McKinlay et al. | |

(Continued)

*Primary Examiner* — Nabil Hindi
(74) *Attorney, Agent, or Firm* — Thomas R. Berthold

(57) ABSTRACT

A two-dimensional magnetic recording (TDMR) disk drive has a gas-bearing slider that includes first and second sensors with a first cross-track spacing electrically coupled to a first magnetic shield, and third and fourth sensors with a different cross-track spacing electrically coupled to a second magnetic shield. The different spacings results in the first and third sensors and the second and fourth sensors having a cross-track spacing to accommodate for the effect of head skew. Each sensor is connected to an associated amplifier by a suspension trace and a common trace connected to its associated shield. Switching circuitry selects either the first and third amplifiers or the second and fourth amplifiers as the active pair depending on the radial location where the data is to be read. Thus the appropriate pair of sensors are aligned with the data tracks despite the presence of high head skew.

21 Claims, 7 Drawing Sheets

(56) References Cited

U.S. PATENT DOCUMENTS

2013/0286502 A1  10/2013  Erden et al.
2015/0098151 A1   4/2015  Gadbois et al.

* cited by examiner

TWO-DIMENSIONAL MAGNETIC RECORDING (TDMR) DISK DRIVE WITH MULTIPLE SENSORS AND CIRCUITRY FOR SELECTION OF AN ACTIVE PAIR OF ASSOCIATED AMPLIFIERS

BACKGROUND

The invention relates generally to a two-dimensional magnetic recording (TDMR) disk drive and more particularly to a TDMR disk drive with multiple stacked sensors wherein different sensors are selected to provide a readback signal.

One type of conventional magnetoresistive (MR) sensor used as the read head in magnetic recording disk drives is a "spin-valve" sensor based on the giant magnetoresistance (GMR) effect. A GMR spin-valve sensor has a stack of layers that includes two ferromagnetic layers separated by a nonmagnetic electrically conductive spacer layer, which is typically copper (Cu) or silver (Ag). One ferromagnetic layer adjacent to the spacer layer has its magnetization direction fixed, such as by being pinned by exchange coupling with an adjacent antiferromagnetic layer, and is referred to as the reference or pinned layer. The other ferromagnetic layer adjacent to the spacer layer has its magnetization direction free to rotate in the presence of an external magnetic field and is referred to as the free layer. With a sense current applied to the sensor, the rotation of the free-layer magnetization relative to the pinned-layer magnetization due to the presence of an external magnetic field is detectable as a change in electrical resistance. If the sense current is directed perpendicularly through the planes of the layers in the sensor stack, the sensor is referred to as a current-perpendicular-to-the-plane (CPP) sensor.

In addition to CPP-GMR read heads, another type of CPP sensor is a magnetic tunnel junction sensor, also called a tunneling MR or TMR sensor, in which the nonmagnetic spacer layer is a very thin nonmagnetic tunnel barrier layer. In a CPP-TMR sensor the amount of tunneling current through the layers depends on the relative orientation of the magnetizations in the two ferromagnetic layers. In a CPP-TMR read head the nonmagnetic spacer layer is formed of an electrically insulating material, such as $TiO_2$, MgO or $Al_2O_3$.

A proposed technology that uses multiple CPP-MR sensors is two-dimensional magnetic recording (TDMR). In TDMR, multiple sensors that are located on a single structure access the same or adjacent data tracks to obtain signals that are processed jointly. This results in an increase in areal data bit density. In addition to increasing areal bit density, TDMR may provide an increased readback areal density through signal processing of two signals from the multiple data tracks that are read concurrently. A structure with multiple stacked read sensors for TDMR is described in US 2013/0286502 A1.

Each of the individual CPP-MR sensors in a TDMR read head structure is required to be located between two shields of magnetically permeable material that shield the sensors from recorded data bits that are neighboring the data bit being read. During readback, the shields ensure that each sensor reads only the information from its target bits.

SUMMARY

In a TDMR sensor structure, such as a structure with two or more stacked sensors, a problem arises due to skew of the sensors at the inside diameter (ID) and outside diameter (OD) regions of the disk. This is because the sensors are supported on a radial actuator that causes the sensors to make an arcuate path across the disk. At the mid-diameter (MD) regions of the disk the skew angle θ (the angle between a line orthogonal to the sensor and the data track) is near zero. However, at the ID and OD regions the skew angle can be up to 10-20 degrees, depending on the geometry of the actuator and disk. This can result in the sensors being misaligned from their target tracks. Reducing the along-the-track spacing between the stacked sensors can reduce the skew effect; however the magnetic shields must have a minimum thickness to be effective, which limits how close the sensors can be spaced.

Embodiments of the invention relate to a TDMR disk drive with multiple read heads or sensors and circuitry that selects an appropriate pair of the sensor amplifiers to enable reading of the data tracks without the adverse effects of high head skew when the head is in the inside diameter (ID) and outside diameter (OD) regions of the disk. The disk drive's gas-bearing slider includes first and second spaced-apart sensors electrically coupled to a first magnetic shield, and third and fourth spaced-apart sensors electrically coupled to a second magnetic shield. The cross-track spacing of the first and second sensors is different from the cross-track spacing of the third and fourth sensors, which results in the first and third sensors and the second and fourth sensors having a cross-track spacing. Each sensor is connected to an associated amplifier by a suspension trace and a common trace connected to its associated shield. Switching circuitry selects either the first and third amplifiers or the second and fourth amplifiers as the active pair depending on the radial location where the data is to be read, i.e., the ID region, the OD region or the mid-diameter (MD) region. Thus the appropriate pair of sensors, with their cross-track spacing, are aligned with the data tracks despite the presence of high skew. A switchable impedance element is associated with each amplifier, so that when the active pair of amplifiers is selected the impedance elements associated with the inactive amplifiers are switched into connection with the suspension traces. This assures that the characteristic impedance at the suspension termination is not significantly altered, which would otherwise cause undesirable transmission line resonance.

For a fuller understanding of the nature and advantages of the present invention, reference should be made to the following detailed description taken together with the accompanying figures.

DETAILED DESCRIPTION

Figure 1:
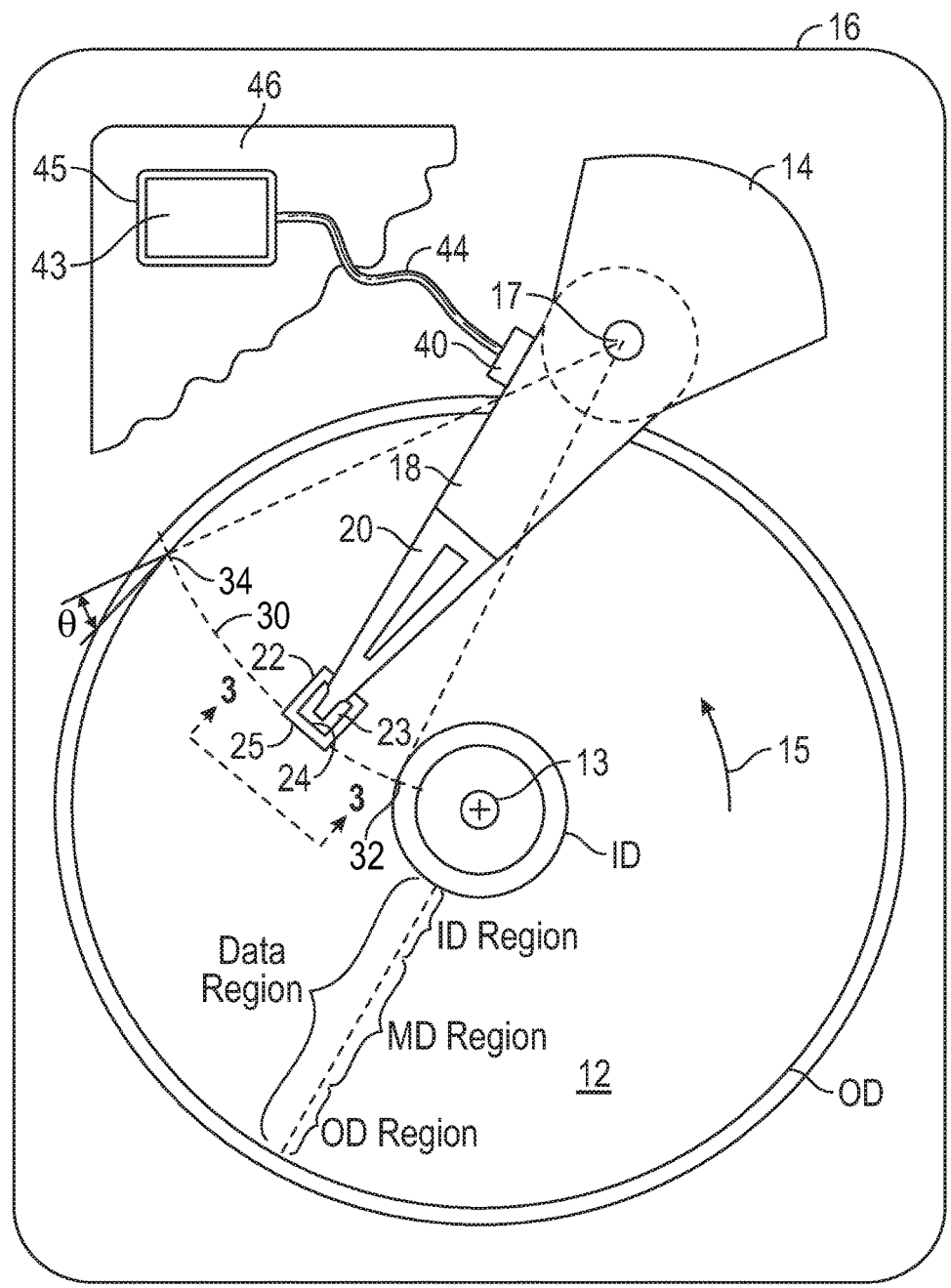
FIG. 1 is a schematic top view of a conventional magnetic recording hard disk drive with the cover removed that can be used for two-dimensional magnetic recording (TDMR).

The CPP magnetoresistive (MR) sensor structure of this invention has application for use in a magnetic recording disk drive, the operation of which will be briefly described with reference to FIGS. 1-5. FIG. 1 is a block diagram of a conventional magnetic recording hard disk drive that can function for two-dimensional magnetic recording (TDMR). The disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or gas-bearing slider 22 is attached to the flexure 23. A magnetic recording read/write head 24 is formed on the trailing surface 25 of slider 22. The flexure 23 and suspension 20 enable the slider to "pitch" and "roll" on a gas-bearing generated by the rotating disk 12. Typically, there are multiple disks stacked on a hub that is rotated by the spindle motor, with a separate slider and read/write head associated with each disk surface.

The rotary actuator causes the head 24 to make an arcuate path 30 across the disk 12 between the inside diameter (ID) and outside diameter (OD) of the data region of the disk 12. Line 32 represents the position of the head 24 at the ID and line 34 represents the position of the head 24 at the OD. The skew angle θ is defined as the angle between an orthogonal to the head 24 (or the trailing surface 25) and the data track, as depicted at line 34 at the OD. Because of the arcuate path 30, the skew angle θ varies with radial position of the head 24 and is zero at some point in the mid-diameter (MD) region and a maximum at the ID and OD.

An arm electronics or read/write electronics integrated circuit (R/W IC) chip or module 40 is attached to actuator 14. A flex cable 44 provides electrical connections between the R/W IC 40 and the disk drive system electronics 43 on a circuit board 46 mounted to base plate 16. The flex cable 44 is rigidly attached by stationary bracket 45 at one end, which connects to the system electronics 43.

Figure 2:
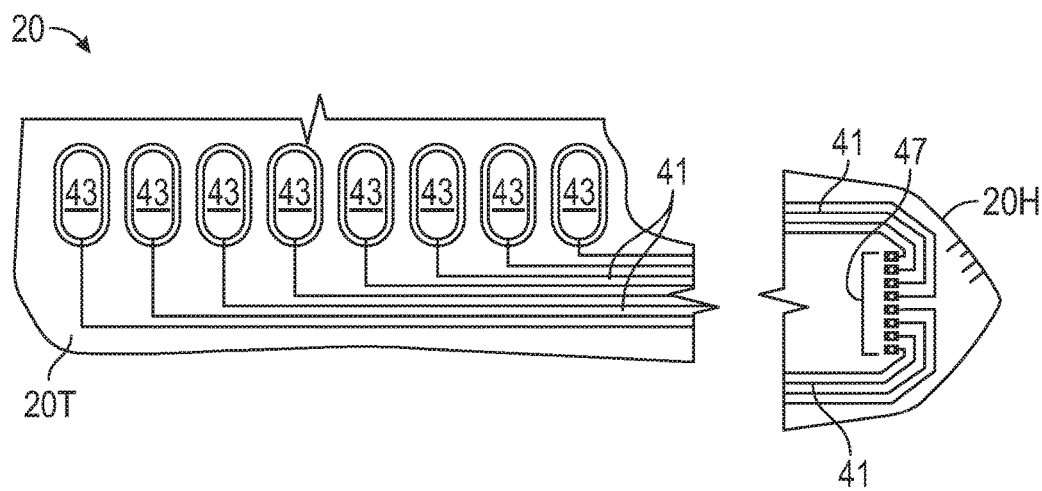
FIG. 2 is an illustration of a top view of a suspension with electrically conductive traces and connection and termination pads according to the prior art.

The R/W IC module 40 is in turn connected by a plurality of electrical paths that extend through the suspension 20 and connect to the slider 22 as further illustrated in FIG. 2. These electrical paths are typically called traces 41 and are typically made of copper. The load beam structure of the suspension is a spring metal layer, which is typically stainless steel. The tail end 20T of the suspension has a set of tail termination pads 43 for electrical connection to the corresponding traces 41. The traces carry the signals for the read heads and write head on the slider, as well as any additional signals required, for example signals for fly height control by heater protrusion actuation. The example suspension in FIG. 2 has eight termination pads that provide connection to eight slider connection pads 47 that are in turn connected to the slider at the slider end 20H of the suspension. Differing numbers of pads and corresponding traces are common. The traces can vary in width and additional structures/features can be included in the paths to control electrical parameters such as impedance. Dielectric material separates the traces from the spring metal layer and a covering layer dielectric material is typically deposited over the traces. Subtractive and/or additive photolithography, deposition and etching processes can be used to manufacture suspensions and form the traces.

Figure 3:
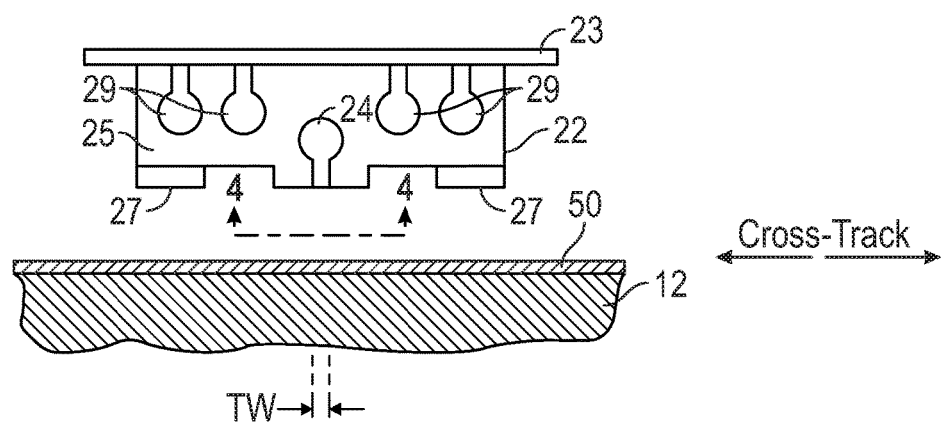
FIG. 3 is a view in the direction 3-3 of FIG. 1 and shows the ends of the write head and TDMR read head structure as viewed from the disk according to the prior art.

FIG. 3 is an enlarged end view of the slider 22 and a section of the disk 12 taken in the direction 3-3 in FIG. 1. The slider 22 is attached to flexure 23 and has a gas-bearing surface (GBS) 27 facing the disk 12 and a trailing surface 25 generally orthogonal to the GBS. The GBS 27 causes the gas flow from the rotating disk 12 to generate a bearing of gas (typically air or helium) that supports the slider 22 in very close proximity to or near contact with the surface of disk 12. The read/write head 24 is formed on the trailing surface 25 and is connected to the disk drive read/write electronics by electrical connection to slider termination pads 29 on the trailing surface 25. As shown in the sectional view of FIG. 2, the disk 12 is a conventional continuous-media (CM) disk wherein the recording layer 50 is a continuous layer of granular recording material. In a CM disk the concentric data tracks with track width TW are created when the write head writes on the continuous recording layer.

Figure 4:
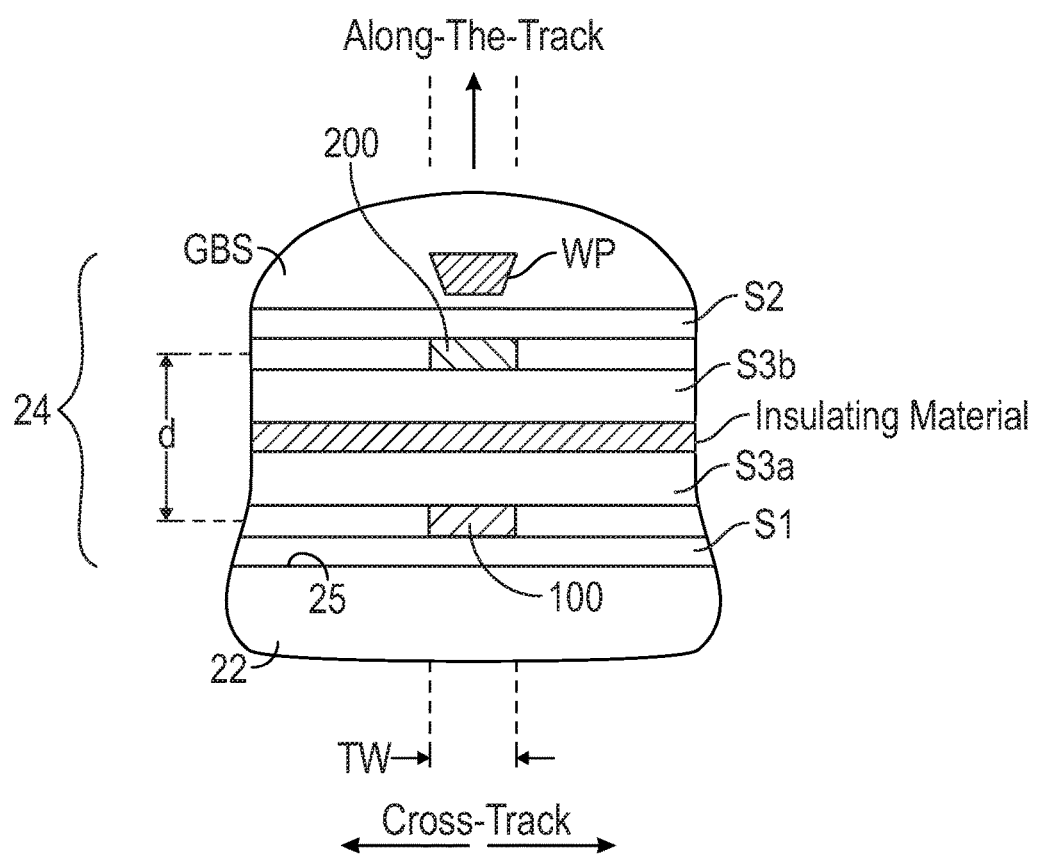
FIG. 4 is view of the gas-bearing surface (GBS) in the direction 4-4 of FIG. 3 showing the layers making up one type of a stacked CPP-MR sensor structure for TDMR according to the prior art as would be viewed from the disk.

FIG. 4 is a view in the direction 4-4 of FIG. 3 and shows the ends of read/write head 24 as viewed from the disk 12. FIG. 4 is not to scale because of the difficulty in showing very small dimensions. The read/write head 24 is a series of thin films deposited and lithographically patterned on the trailing surface 25 of slider 22, using well-known thin film head fabrication techniques. The write head includes a perpendicular magnetic write pole (WP) and may also include trailing and/or side shields (not shown).

The read head portion of read/write head 24 is depicted as a sensor structure of stacked multiple CPP-MR read heads or sensors 100, 200 for use in a disk drive with TDMR. In this example both read sensors 100, 200 are aligned with one another (vertically in FIG. 4) with an along-the-track or "down track" spacing "d" so as to read the same data track with trackwidth TW. Lower read sensor 100 is located between two magnetic shields, lower shield S1 and center shield S3a. Upper read sensor 200 is also located between two magnetic shields, center shield S3b and upper shield S2. The shields S1, S3a, S3b and S2 are formed of magnetically permeable material and may be electrically conductive so they can function as the electrical leads to the read sensors 100 and 200. The shields may be formed of any of the well-known materials used for conventional magnetic shields, for example NiFe alloys wherein Ni is present in the NiFe alloy in an amount greater than about between 40 atomic percent. Alternatively, other soft ferromagnetic materials may be used, like NiFeCr, NiFeMo, CoZrTa, CoZrNb and CoFeZr alloys. A layer of insulating material separates shields S3a and S3b so that the two sensors are electrically isolated from one another. The shields function is to shield the read sensors 100 and 200 from recorded data bits that neighbor the data bit being read. Typically the lower and upper shields S1 and S2, respectively, may each be up to several microns thick in the along-the-track direction, as compared to the total thickness of each read sensor 100, 200 in the along-the-track direction, which may be in the range of about 20 to 40 nm. The structure, function and method of fabrication of CPP-MR read sensors 100, 200 are well-known and thus not described in detail.

FIG. 4 illustrates an example where the stacked sensors 100, 200 are aligned vertically to read the same data track. In one application, the readback signals from the two sensors may be processed to double the signal for the same relative amount of electronic noise, and thus increase the signal-to-noise ratio (SNR). However, sensors 100 and 200 may also be laterally offset from each other to read different portions of the same track, or to read separate tracks.

Figure 5:
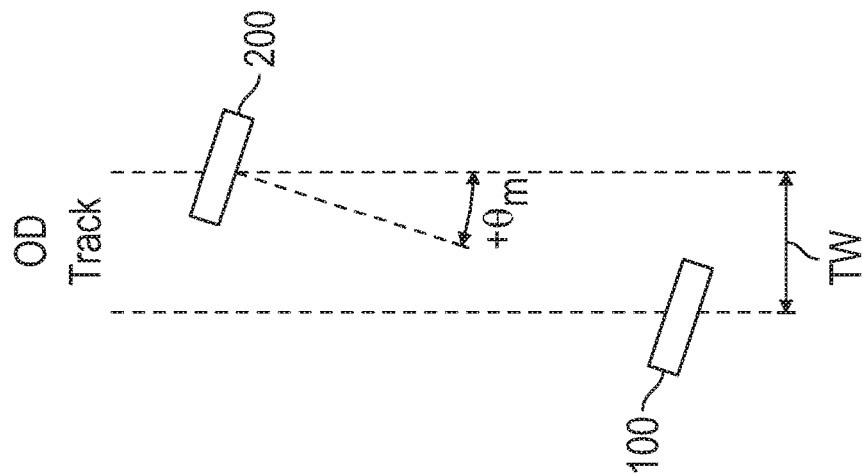
FIG. 5 is a view looking at the disk and illustrates the problem of skew for the stacked sensors shown in the prior art structure of FIG. 4.
Figure 5:
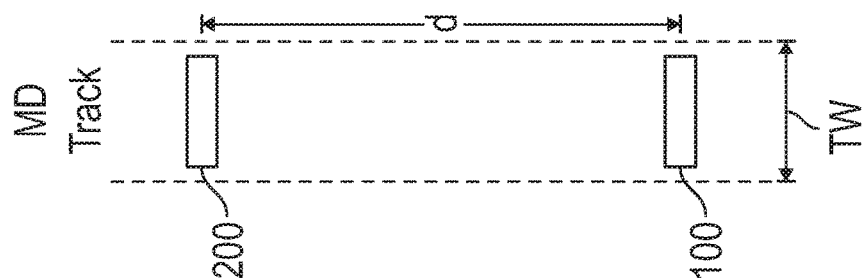
Figure 5:
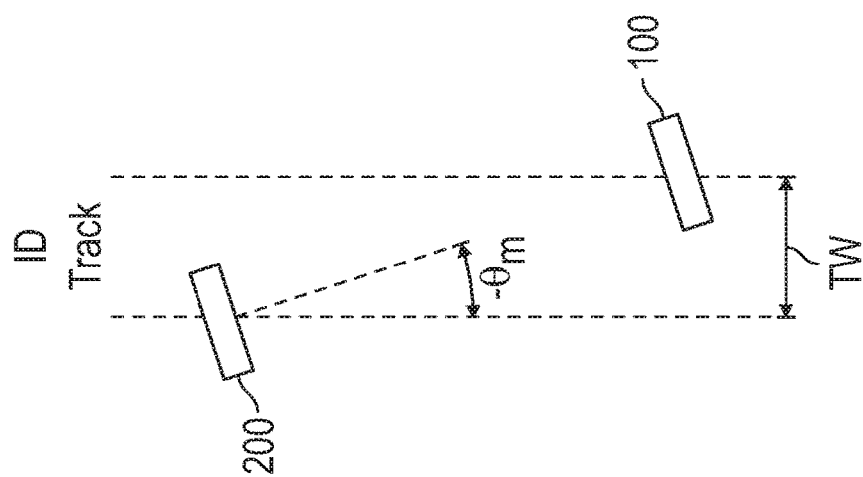

Because the sensors 100, 200 are spaced along-the-track direction a problem arises due to skew of the sensors in the ID and OD regions. This is depicted in FIG. 5. In the mid-diameter (MD) region there is very little skew ($\theta$=0), and both sensors 100, 200 are aligned with the data track. At the ID region, sensor 200 has been shifted to the left and sensor 100 shifted to the right as a result of skew $-\theta_m$, so that now each sensor reads only a portion of the track. Similarly, at the OD region, sensor 200 has been shifted to the right and sensor 100 shifted to the left as a result of skew $+\theta_m$, so that now each sensor again reads only a portion of the track. One solution would appear to be to reduce along-the-track spacing "d". However, "d" cannot be reduced because of the required thickness of shields S3a and S3b (FIG. 4).

Figure 6:
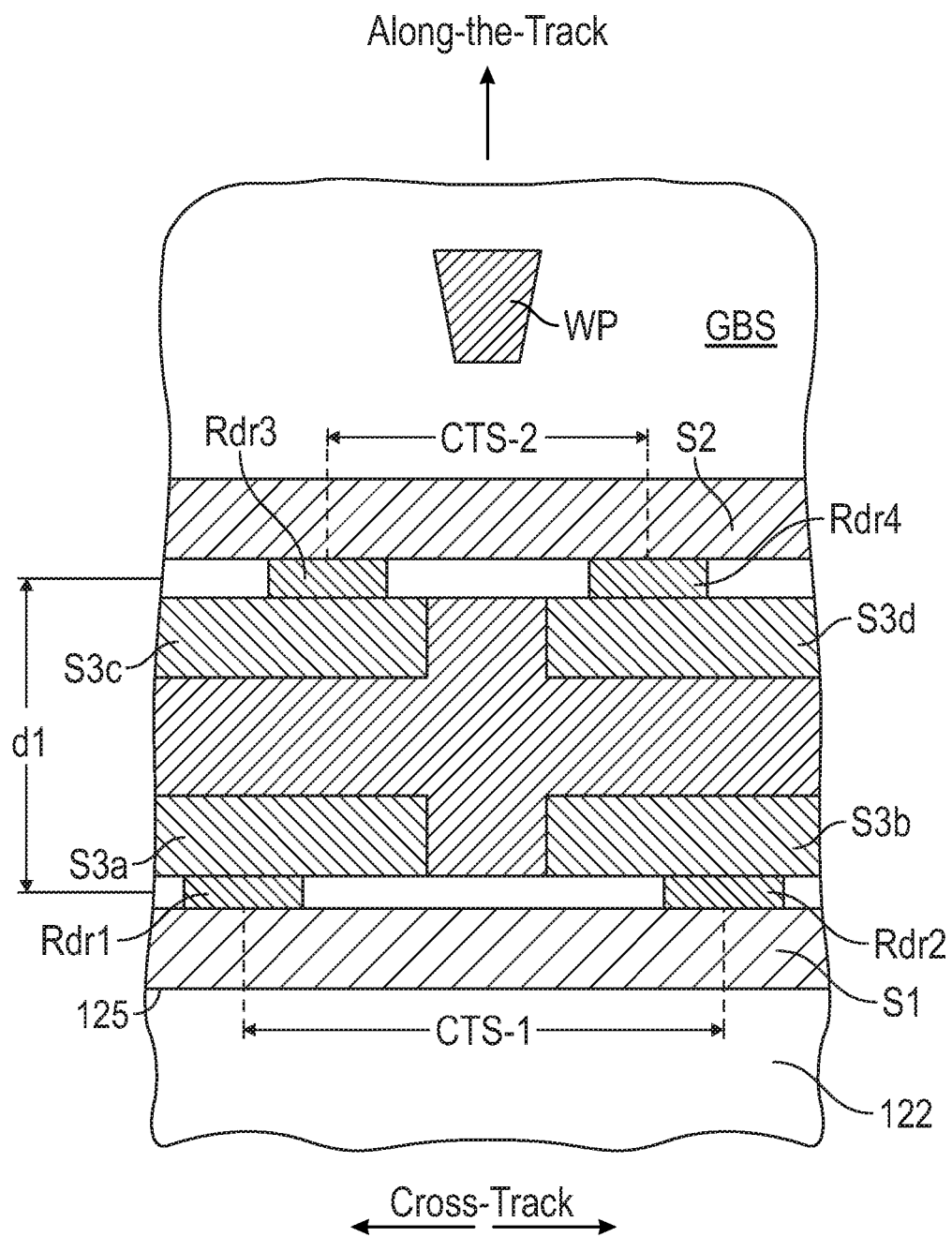
FIG. 6 is a schematic showing an embodiment of the invention with four stacked sensors (readers Rdr1, 2, 3, 4) and their magnetic shields S1, S2, S3.

An embodiment of the invention is a stacked multi-sensor that allows for TDMR without the adverse effects of high skew in the ID and OD regions. FIG. 6 is a schematic showing an embodiment of the invention with four stacked sensors (readers Rdr1, 2, 3, 4) and their magnetic shields S1, S2 and center magnetic shields S3a, S3b, S3c and S3d. FIG. 6 is not to scale because of the difficulty in showing very small dimensions.

Rdr1 and Rdr2 are located on and electrically coupled to lower magnetic shield S1 that is formed on the trailing surface 125 of slider 122. Rdr1 and Rdr2 have a cross-track spacing (CTS-1). Rdr1 is located between lower shield S1 and center shield S3a. Rdr2 is located between lower shield S1 and center shield S3b. Electrical connection to Rdr1 is through shield S3a and electrical connection to Rdr2 is through shield S3b, with Rdr1 and Rdr2 sharing a common electrical lead S1.

Rdr3 and Rdr4 are electrically coupled to upper magnetic shield S2. Rdr3 and Rdr4 have a cross-track spacing (CTS-2) different from CTS-1. Rdr3 and Rdr4 are spaced from Rdr1 and Rdr2 in the along-the-track direction by a distance d1. Rdr3 is located between upper shield S2 and center shield S3c. Rdr4 is located between upper shield S2 and center shield S3d. Electrical connection to Rdr3 is through shield S3c and electrical connection to Rdr4 is through shield S3d, with Rsr3 and Rdr4 sharing a common electrical lead S2.

Insulating material is located between S3a, S3b and S3c, S3d so that the pair of sensors Rdr1, Rdr2 is electrically isolated from the pair of sensors Rdr3, Rdr4. The insulating material also separates S3a from S3b and S3c from S3d. While the shields also function as electrical leads for the sensors in the embodiment depicted in FIG. 6, it is also possible to have separate electrical leads located between the shields and the sensors.

Figure 7:
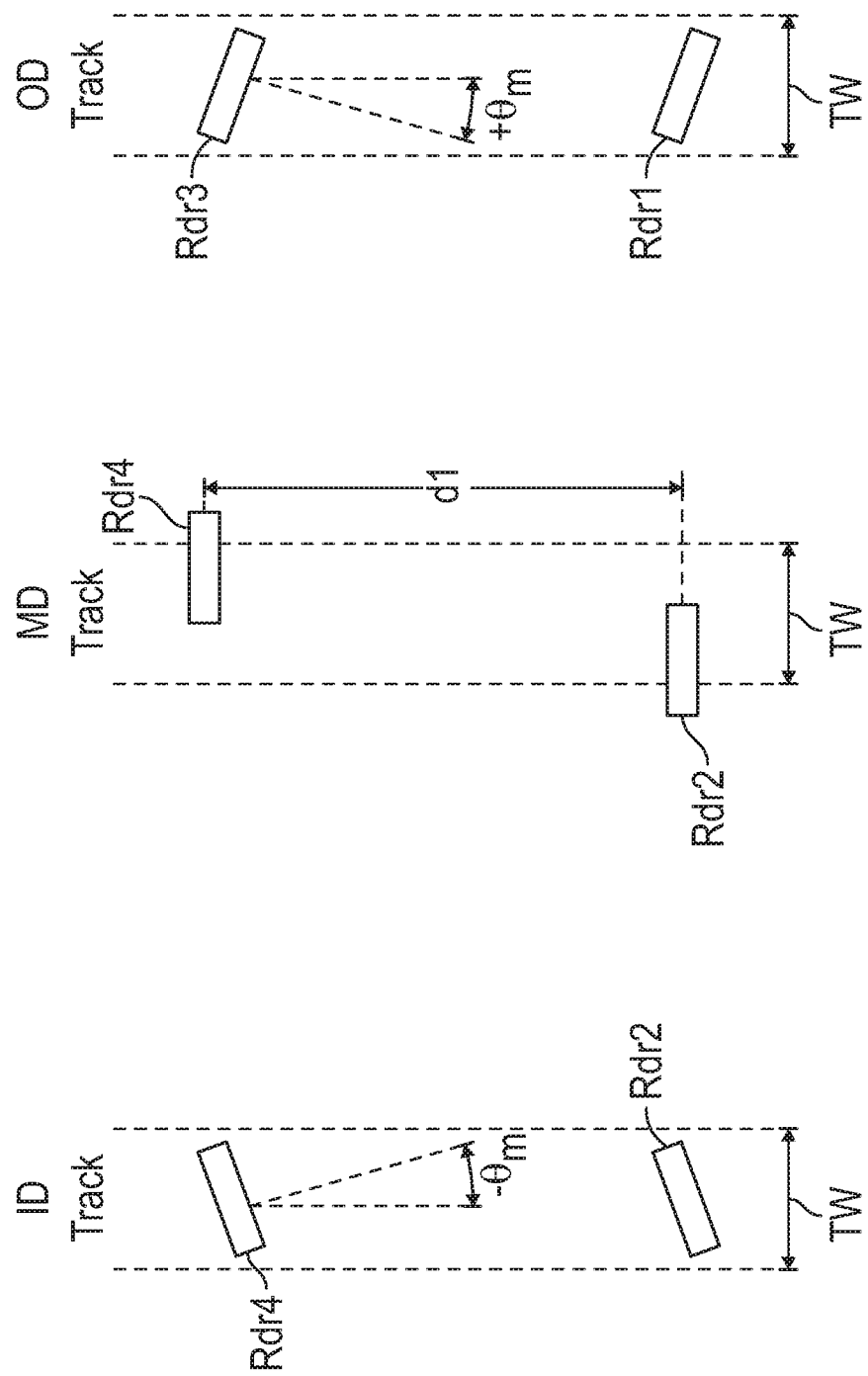
FIG. 7 is a view looking at the disk and illustrates how the selected sensors address the problem of skew in an embodiment of the invention.

In an embodiment of the invention only either Rdr1 and Rdr3 or Rdr2 and Rdr4 are providing readback signals during operation. The set of sensors selected depends on the radial position of the slider on the disk. FIG. 7 is a view looking at the disk and illustrates how the selected sensors address the problem of skew. At the ID region, Rdr2 and Rdr4 are active and both are substantially aligned with the data track. At the OD region, Rdr1 and Rdr3 are active and both are substantially aligned with the data track. When the slider is precisely at the MD location where the skew is zero, either set of sensors will be aligned with a substantial portion of the track, as depicted in FIG. 7 with Rdr2 and Rdr4 being the selected set. The appropriate set of sensors is selected depending on the intended radial location of the slider relative to this midpoint, i.e., toward the ID or the OD.

FIGS. 6 and 7 depict a TDMR embodiment wherein the active readers (Rdr1, Rdr3 or Rdr2, Rdr4) are designed to read a single track. However, by proper selection of the spacings d1, CTS-1 and CTS-2, the active readers can function in a TDMR system wherein two adjacent tracks are read simultaneously. Also, the width of the individual sensors relative to the trackwidth TW can be selected based on the desired manner in which the readback signals are intended to be processed.

Figure 8:
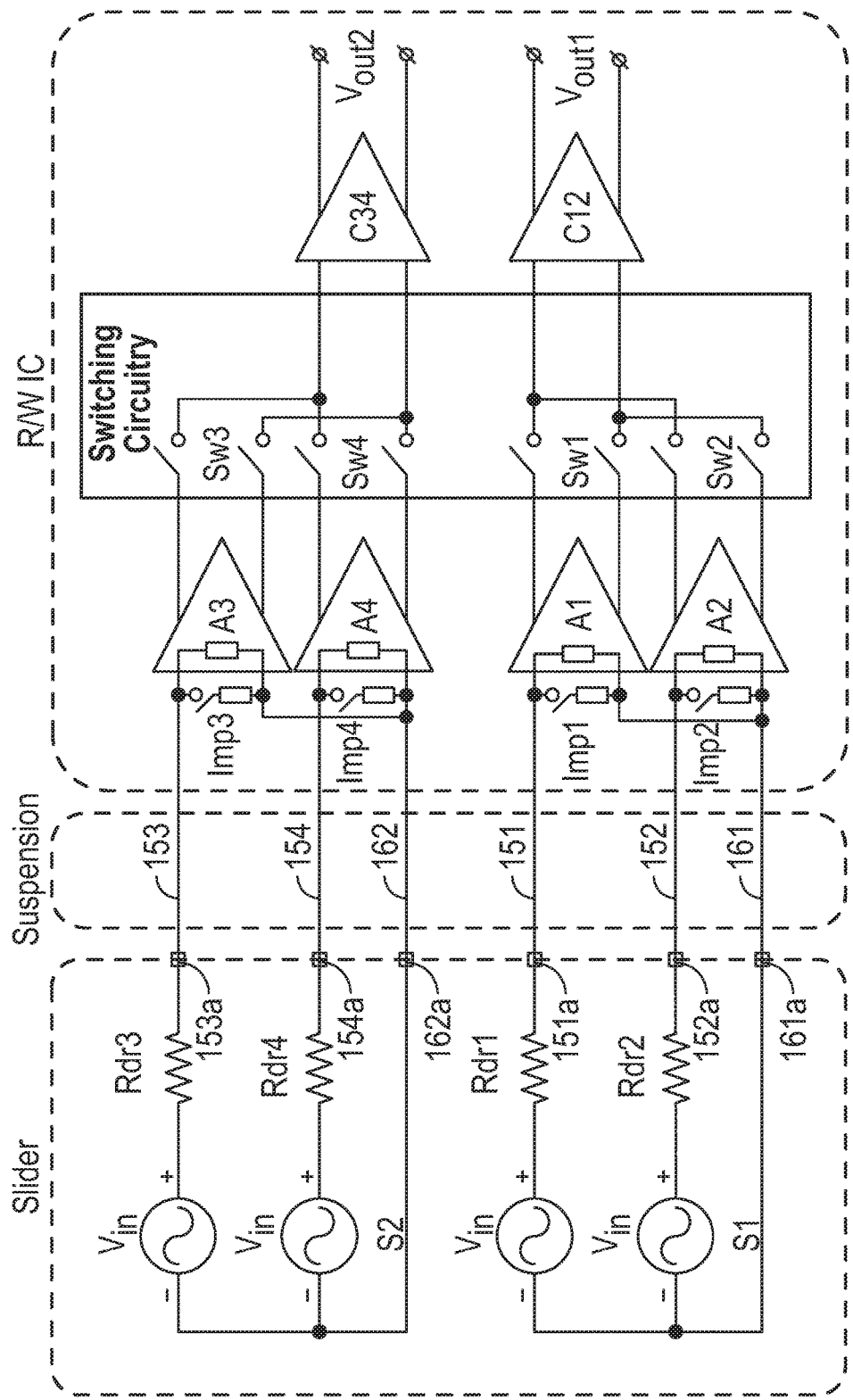
FIG. 8 is an electrical schematic showing the slider with sensors (readers Rdr1, 2, 3, 4), the suspension and the read/write integrated circuit (R/W IC) according to an embodiment of the invention.

FIG. 8 is an electrical schematic showing the slider with sensors (Rdr1, 2, 3, 4), the suspension and the R/W IC. The R/W IC contains the amplifiers for the associated sensors, the switching circuitry for selecting the pair of amplifiers, and the multiplexer (mux) amplifiers that provide the combined readback signal. Rdr1 and Rdr2 are connected to their associated amplifiers A1, A2 by respective traces 151, 152 and common trace 161 on the suspension. The pair of amplifiers A1, A2 thus have three inputs, including a common input connected to common trace 161. Rdr1 and Rdr2 are electrically connected to lower shield layer S1 that is connected to common trace 161.

Rdr3 and Rdr4 are connected to their associated amplifiers A3, A4 by respective traces 153, 154 and common trace 162, which is connected to upper shield layer S2. The pair of amplifiers A3, A4 thus have three inputs, including a common input connected to common trace 162. The lower shield layer S1 and its common trace 161 are electrically isolated from upper shield layer S2 and its common trace 162. The use of common traces 161, 162 means that only three traces are required to connect Rdr1 and Rdr2 to their amplifiers and only three traces are required to connect Rdr3 and Rdr4 to their amplifiers. This reduces the number of termination pads (as depicted by pads 29 in FIG. 3) that are required on the slider and suspension. As shown in FIG. 8, slider termination pads 151a, 152a, 161a are connected to associated suspension traces 151, 152, 161. Similarly, slider termination pads 153a, 154a, 162a are connected to associated suspension traces 153, 154, 162.

FIG. 8 shows that common traces 161, 162 are split into two common sub-traces on the R/W IC, with each sub-trace going into an associated amplifier, for example trace 161 having a sub-trace going into the lower portion of amplifier A1 and the other sub-trace going into a lower portion of amplifier A2. However, alternatively the common traces 161, 162 can be split into two common sub-traces on the suspension instead of on the R/W IC, for example trace 161 would have one sub-trace going across the suspension-R/W IC interconnect to the lower portion of amplifier A1 and the other sub-trace going across the suspension-R/W IC interconnect to the lower portion of amplifier A2.

The amplifiers A1, A2, A3 and A4 are connected to respective switches SW1, SW2, SW3 and SW4 that are controlled by the switching circuitry. In response to a system command to move the slider to an intended radial position on the disk, the switching circuitry opens one set of switches and closes the other set. When SW1 and SW3 are closed and SW2 and SW4 are open, amplifiers A1, A3 become the active pair and Rdr1 and Rdr3 provide readback signals. Similarly, when SW2 and SW4 are closed and SW1 and SW3 are open, amplifiers A2, A4 become the active pair and Rdr2 and Rdr4 provide readback signals. Mux amplifier C12 provides an output from either amplifier A1 or A2 while mux amplifier C34 provides an output from either amplifier A3 or A4. Mux amplifiers C12 and C34 thus provide the output signals from the active pair of amplifiers to the system electronics.

In embodiments of this invention all of the readers and amplifiers are connected to the transmission line that connects the readers to the amplifiers through the suspension, but only some of the amplifiers are active. This presents a problem in that the open or inactive amplifiers alter the characteristic impedance at the suspension termination. This can cause undesirable transmission line resonance. To address this problem, each amplifier A1-A4 has an associated selectable impedance element Imp1-Imp4, as shown in FIG. 8. Each impedance element has a value substantially equivalent to the impedance presented when the associated amplifier is active. Thus, for example, when SW1 and SW3 are closed to select A1 and A3 as the active pair, Imp2 and Imp 4 are active by closing the switching circuitry to connect to the suspension termination so that the characteristic impedance of the transmission line termination is not significantly altered. Similarly, when SW2 and SW4 are closed to select A2 and A4 as the active pair, Imp1 and Imp3 are active by closing the switching circuitry to connect to the suspension for proper termination. The impedance elements, Imp1-Imp4, may be fixed or programmable resistors, or the impedance elements can represent active termination such as emitter-follower input, such that the bias current determines the input impedance without signal propagation to save power.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising:
    a rotatable magnetic recording disk having a plurality of circular data tracks;
    a head carrier having a disk-facing surface and a trailing surface substantially orthogonal to the disk-facing surface and extending in a generally cross-track direction relative to the data tracks;
    a rotary actuator connected to the carrier for moving the carrier across the disk;
    a first shield layer on the trailing surface of the carrier;
    first and second read heads electrically connected to the first shield layer and spaced apart in a cross-track direction;
    a second shield layer on the trailing surface of the carrier;
    third and fourth read heads electrically connected to the second shield layer and spaced apart in a cross-track direction different from the cross-track spacing of the first and second read heads, the third and fourth read heads being spaced from the first and second read heads in an along-the-track direction;
    a suspension comprising a first set of traces that includes a common trace connected to the first shield layer and traces connected to the first and second read heads, and a second set of traces that includes a common trace connected to the second shield layer and traces connected to the third and fourth read heads, the common traces being electrically isolated from one another;
    four amplifiers, each amplifier connected to a trace from an associated read head and its associated common trace; and
    switching circuitry connected to the amplifiers for selecting either first and third amplifiers of the four amplifiers or second and fourth amplifiers of the four amplifiers as an active pair, the unselected amplifiers being an inactive pair.

2. The disk drive of claim 1 further comprising a switchable impedance element associated with each amplifier and connected to the switching circuitry, the impedance elements of the inactive pair of amplifiers being configured for connection to the suspension traces in response to selection of the active pair of amplifiers.

3. The disk drive of claim 1 further comprising first and second multiplexer amplifiers connected to the switching circuitry for providing output signals from the selected active pair of amplifiers.

4. The disk drive of claim 1 wherein the switching circuitry is adapted to select the active pair of amplifiers in response to the intended radial position of the head carrier on the disk.

5. The disk drive of claim 1 wherein the cross-track spacings enable the first and third read heads and the second and fourth read heads to read data from the same data track.

6. The disk drive of claim 1 wherein the cross-track spacings enable the first and third read heads and the second and fourth read heads to read data from adjacent data tracks.

7. The disk drive of claim 1 further comprising insulating material between the first and second read heads and the third and fourth read heads for electrically isolating the first and second read heads from the third and fourth read heads.

8. The disk drive of claim 1 wherein each common trace comprises two common sub-traces, wherein each amplifier connected to a trace from an associated read head and its associated common trace is connected to one of the sub-traces of said associated common trace.

9. The disk drive of claim 1 further comprising a plurality of center shields, each center shield associated with a read head.

10. The disk drive of claim 9 wherein the first read head is located between the first shield and a first center shield and the second read head is located between the first shield and a second center shield.

11. The disk drive of claim 9 wherein the third read head is located between a third center shield and the second shield and the fourth read head is located between a fourth center shield and the second shield.

12. A two-dimensional magnetic recording (TDMR) disk drive comprising:
    a rotatable magnetic recording disk having a plurality of circular data tracks;
    a slider having a gas-bearing surface and a trailing surface substantially orthogonal to the gas-bearing surface and extending in a generally cross-track direction relative to the data tracks;
    a rotary actuator connected to the slider for moving the slider across the disk;
    a first shield layer on the trailing surface of the slider;
    first and second read heads electrically connected to the first shield layer and spaced apart in a cross-track direction;
    a second shield layer on the trailing surface of the slider;
    third and fourth read heads electrically connected to the second shield layer and spaced apart in a cross-track direction different from the cross-track spacing of the first and second read heads, the third and fourth read heads being spaced from the first and second read heads in an along-the-track direction;
insulating material between the first and second read heads and the third and fourth read heads for electrically isolating the first and second read heads from the third and fourth read heads;
a suspension comprising a first set of traces that includes a common trace connected to the first shield layer and traces connected to the first and second read heads, and a second set of traces that includes a common trace connected to the second shield layer and traces connected to the third and fourth read heads, the common traces being electrically isolated from one another;
four amplifiers, each amplifier connected to a trace from an associated read head and its associated common trace;
switching circuitry responsive to the intended radial position of the slider on the disk and connected to the amplifiers for selecting either first and third amplifiers of the four amplifiers or second and fourth amplifiers of the four amplifiers as an active pair, the unselected amplifiers being an inactive pair; and
a switchable impedance element associated with each amplifier and connected to the switching circuitry, the impedance elements of the inactive pair of amplifiers being adapted for connection to the suspension traces in response to selection of the active pair of amplifiers.

13. The TDMR disk drive of claim 12 wherein the cross-track spacings enable the first and third read heads and the second and fourth read heads to read data from the same data track.

14. The TDMR disk drive of claim 12 wherein the cross-track spacings enable the first and third read heads and the second and fourth read heads to read data from adjacent data tracks.

15. A magnetoresistive read head structure for reading data from data tracks in a two-dimensional magnetic recording (TDMR) disk drive, the read head structure comprising:
a head carrier having a surface for facing a disk and a trailing surface generally orthogonal to the disk-facing surface;
a first magnetic shield on the trailing surface;
first and second read heads electrically connected to the first shield and spaced apart in a cross-track direction;
a second magnetic shield on the trailing surface of the carrier;
third and fourth read heads electrically connected to the second shield and spaced apart in a cross-track direction different from the cross-track spacing of the first and second read heads, the third and fourth read heads being spaced from the first and second read heads in an along-the-track direction, the first and second shields being electrically isolated from one another;
a first slider termination pad electrically connected to the first shield; and
a second slider termination pad electrically connected to the second shield, the first and second slider termination pads being electrically isolated from one another.

16. The read head structure of claim 15 further comprising insulating material between the first and second read heads and the third and fourth read heads for electrically isolating the first and second read heads from the third and fourth read heads.

17. The read head structure of claim 15 further comprising a plurality of center magnetic shields between the first and second shields, each center shield associated with a read head.

18. The read head structure of claim 15 wherein the cross-track spacings enable the first and third read heads and the second and fourth read heads to read data from the same data track.

19. The read head structure of claim 15 wherein the cross-track spacings enable the first and third read heads and the second and fourth read heads to read data from adjacent data tracks.

20. An integrated circuit module adapted to receive signals from a plurality of magnetic recording disk drive read heads, the module comprising:
a first pair of amplifiers, each amplifier having an input adapted to receive a signal from an associated read head, the first pair of amplifiers being connected by a common input;
a second pair of amplifiers, each amplifier having an input adapted to receive a signal from an associated read head, the second pair of amplifiers being connected by a common input that is electrically isolated from the common input of the first pair of amplifiers;
switching circuitry connected to the amplifiers in the first and second pairs for selecting one amplifier from each pair to thereby select an active pair of amplifiers;
a first multiplexer amplifier connected to the switching circuitry for providing an output signal from one of the amplifiers in the active pair; and
a second multiplexer amplifier connected to the switching circuitry for providing an output signal from the other of the amplifiers in the active pair.

21. The integrated circuit module of claim 20 further comprising a plurality of switchable impedance elements connected to the switching circuitry, each impedance element adapted for connection to an input of an associated amplifier in the first and second pairs, the impedance elements being capable of being switched on in response to selection of an active pair of amplifiers.

* * * * *